Feb. 11, 1930.   R. D. PIKE ET AL   1,746,905
PROCESS FOR PURIFYING MONO POTASSIUM PHOSPHATE
Filed July 9, 1928
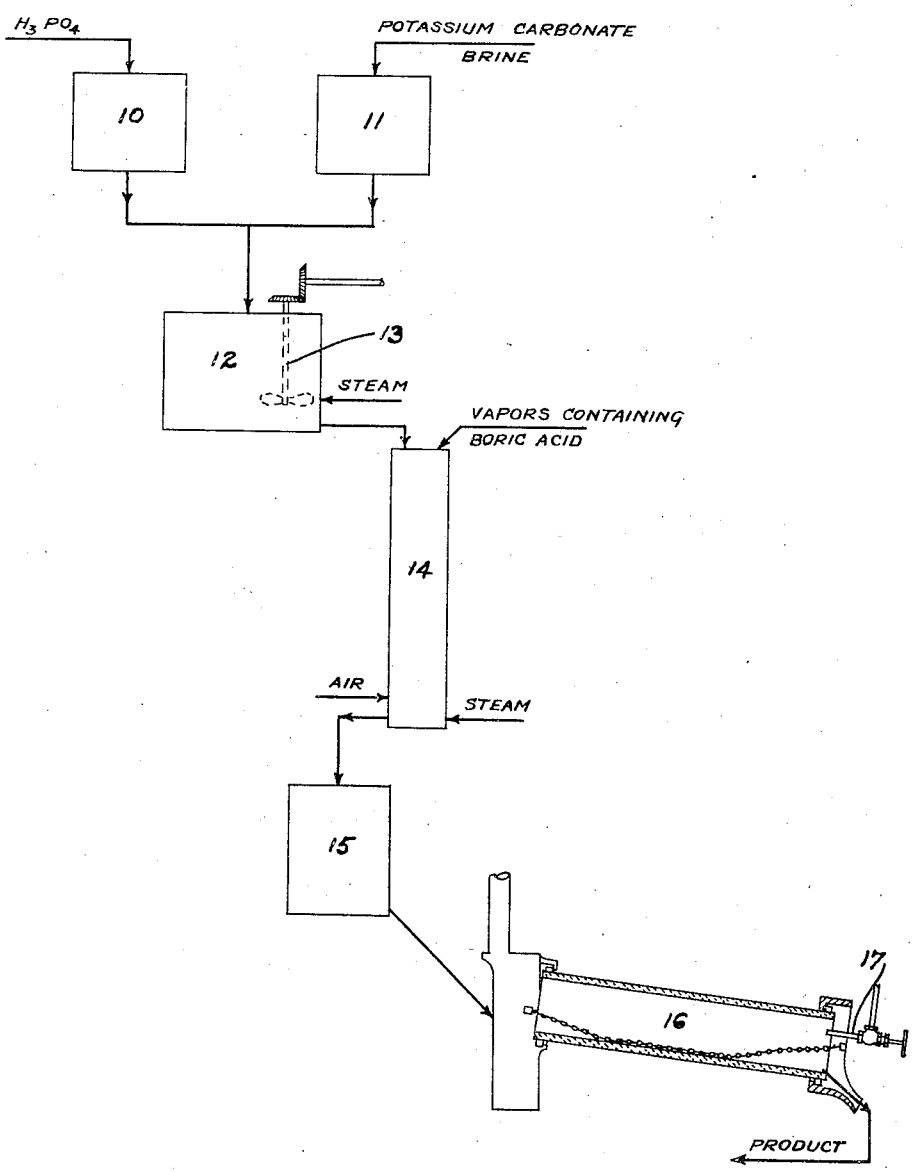
INVENTOR.
ROBERT D. PIKE
ROSS CUMMINGS.
BY
ATTORNEYS.

Patented Feb. 11, 1930

1,746,905

UNITED STATES PATENT OFFICE

ROBERT D. PIKE, OF PIEDMONT, AND ROSS CUMMINGS, OF BERKELEY, CALIFORNIA; SAID CUMMINGS ASSIGNOR TO SAID PIKE

PROCESS FOR PURIFYING MONO POTASSIUM PHOSPHATE

Application filed July 9, 1928. Serial No. 291,314.

Our present invention relates to a process for removing borax from solutions which consist principally of mono potassium phosphate.

An object of our invention is to provide a process in which solutions of mono potassium phosphate containing borax may be run to dryness to produce crude mono potassium phosphate suitable for use as a chemical fertilizer.

In practice we have found that solutions of the above character contain from traces up to a considerable amount of borax and, as Government regulations tolerate only .5% of borax in fertilizers, it becomes of vital concern to remove all or the greater part of the borax from the solution.

We have discovered that solution of mono potassium phosphate are acidic enough to cause the decomposition of the borax into sodium phosphate and boric acid, and the latter forms a volatile, hydrated compound. We have also found that if we subject these solutions to efficient aeration, and at the same time inject steam which is preferably superheated to avoid condensation, into them to maintain a temperature of 70° to 100° C., practically all or any desired portion of the borax present may be removed by volatilization, so that the product will have a content of $B_2O_3$, figured as borax, which will be within the Government requirements.

In order to more fully describe our invention, we have prepared a flow sheet showing in outline the various apparatus involved in carrying out our process.

In this flow sheet we have designated by the numerals 10 and 11 two suitable tanks which are adapted to hold respectively phosphoric acid and potassium carbonate brine. These tanks 10 and 11 are connected by suitable means and are adapted to discharge their contents into a tank 12 wherein the desired degree of neutralization is effected. The tank 12 is provided with a suitable agitating means 13 which thoroughly mixes the solutions when they are introduced into this tank. Provision is also made for the introduction of steam into the tank 12 for the purpose of heating the same. The tank 12 is connected to suitable aerating apparatus which is capable of efficiently aerating the liquid as it flows therethrough. The apparatus 14 is provided with air and steam inlets at suitable points by means of which the aeration operation is carried out. The time of passage of the liquid through the apparatus 14 is so regulated that the desired amount of $B_2O_3$ will be removed.

It will sometimes be found desirable in cases where a phosphoric acid which contains considerable iron and alumina is employed to reduce the viscosity of the liquid by adding a little water at the top of the apparatus 14. After the material passes through the apparatus 14, it will be discharged into a suitable storage tank 15 and from there run to dryness in a rotary kiln 16 or in other suitable apparatus. The furnace 16 is shown as provided with a drag chain for the purpose of preventing an accumulation of the material within the kiln and also has a suitable gas burner 17 for heating the same.

While we have described a preferred embodiment of our invention as now known to us, it is to be understood that various changes may be made therein without departing from the spirit of the invention as defined in the appended claim.

Having thus described our invention, what we claim and desire to obtain by Letters Patent is—

A process for producing concentrated plant food sufficiently low in boric anhydride content for use as a fertilizer from a brine containing potassium carbonate and boric anhydride, and phosphoric acid, which consists in mixing the acid with the brine, subjecting the mixture to distillation to remove boric anhydride, and then running the liquid remaining after distillation to dryness to produce a concentrated fertilizer chemical consisting principally of a compound of phosphoric acid and potash.

ROBERT D. PIKE.
ROSS CUMMINGS.